United States Patent Office.

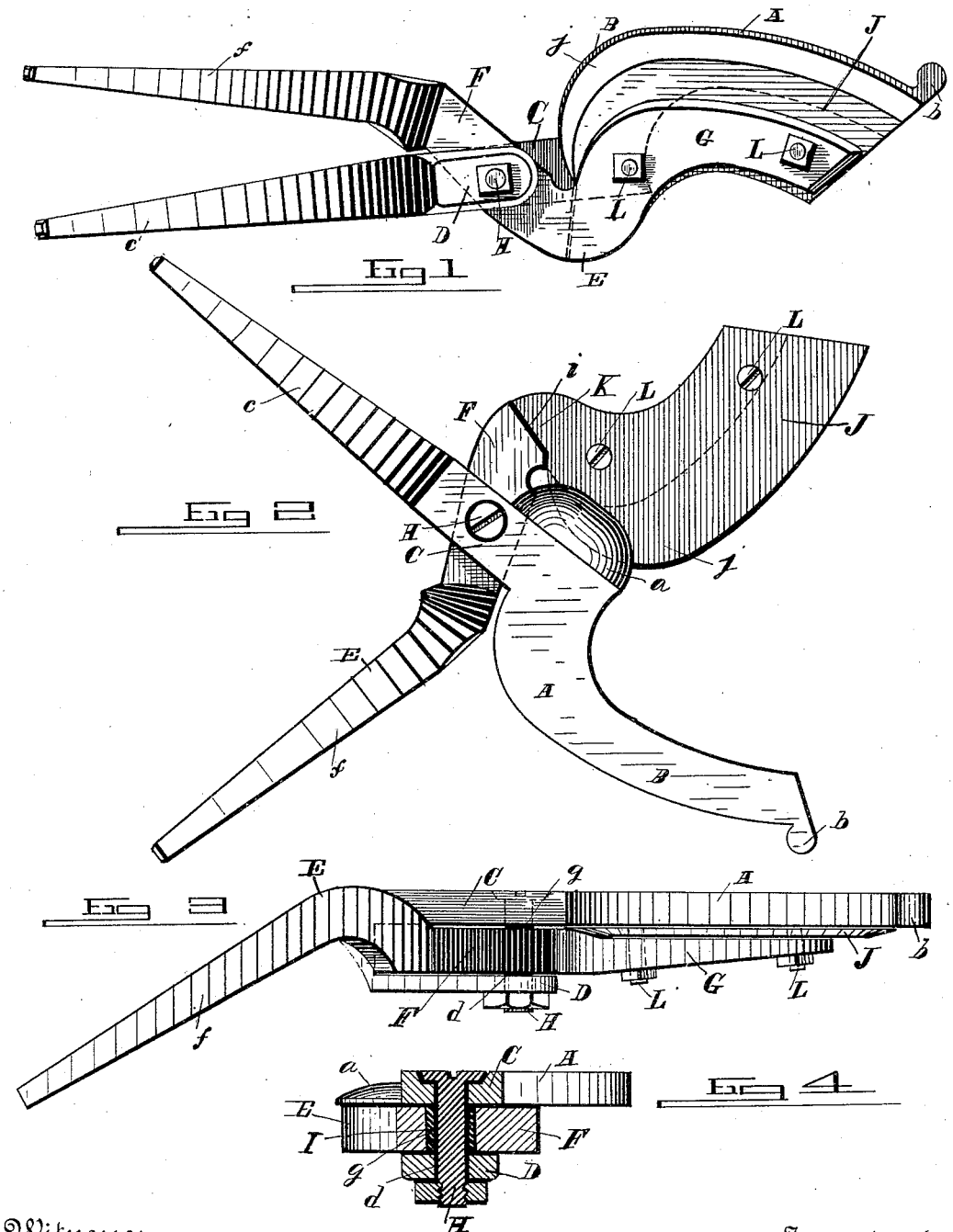

FREDERICK GERFIN AND FREDRICK C. GERFIN, OF COLUMBIA, PENNSYLVANIA.

PRUNING IMPLEMENT.

SPECIFICATION forming part of Letters Patent No. 432,396, dated July 15, 1890.

Application filed February 7, 1890. Serial No. 339,582. (No model.)

*To all whom it may concern:*

Be it known that we, FREDERICK GERFIN and FREDRICK C. GERFIN, of Columbia, in the county of Lancaster and State of Pennsylvania, have invented certain new and useful Improvements in Tobacco-Cutters; and we do hereby declare that the following is a full, clear, and exact description thereof, reference being had to the accompanying drawings, and to the letters of reference marked thereon, which form part of this specification, in which—

Figure 1 is a front face view of our improved tobacco-cutting knife. Fig. 2 is a rear face view thereof; Fig. 3, an edge view; Fig. 4, a sectional view through the pivot-joint.

This invention is an improvement in cutters or shears, and is especially adapted for use as a tobacco-cutter for severing leaves from the stalk, and may also be used as a pruning implement; and it consists in the peculiar construction and combination of parts hereinafter clearly specified.

Referring to the drawings by letter, A and E designate the two main pieces of the implement, which are pivotally connected together, as hereinafter described. Piece A is roughly bayonet-shaped, having a curved jaw B at its front end, the point $b$ of which is bent outward at an angle, as shown, while the other extremity of this jaw is integrally connected with the shank C, which has a tapered portion $c$ projecting upwardly at an angle to the plane of the shank and jaw, as shown, and to which may be secured an operating-handle.

$a$ designates an ear projecting laterally from the shank at the junction of the jaw therewith, the face of said ear being flush with the inner side of the jaw, as shown.

D designates an arm formed integral with shank C and rising from the inner face thereof at the base of portion $c$ and projecting forward parallel with shank C to a point opposite the rear edge of ear $a$. This arm is perforated at its extremity, as at $d$, and opposite a similar perforation in shank C, as shown.

The piece E has a shank F, formed with a tapering portion $f$, for attachment to a handle, this portion $f$ inclining upwardly and laterally to the main portion of the shank, as shown, and at the front end of the shank is a bent jaw G, which is shorter and less curved than jaw B of piece A; but in general contour the pieces A E are much alike. Shank F is perforated at $g$, and is slipped between arm D and shank C of piece A and secured thereto by a pivot-bolt H, which is passed through the openings in shank C and arm D and securely nutted. The arm D prevents binding of shank F on shank C, and twisting of the bolt H should it work loose, so that the cutting-blade, which is secured to jaw G, will be moved directly toward or from jaw B and not allowed any lateral inclination, so that while the cutting is true the edge of the cutting-blade cannot bind or scrape against the jaw B, with which it co-operates in cutting. In order to prevent loosening of the bolt H and wear of the opening $g$, a collar or tubular washer I is placed in opening $g$ around bolt H, as shown, which in a large measure protects bolt and opening $g$ from wear.

Jaw G is of less width than shank F, and at its junction therewith is a shoulder $i$.

J designates the cutter-blade, the outer edge of which corresponds in contour to the outer edge of jaw G, and its inner cutting-edge corresponds in contour to the outer edge of jaw B, as shown. The base or rear edge of the cutter-blade is rounded, as shown at $j$, and this rounded edge is sharpened to form a continuation of the inner or cutting edge of the blade, as shown. At the inner end of the blade is an angular piece K, the edge of which fits snugly against shoulder $i$, and in part relieves strain on the screws or bolts L L, that pass through countersunk openings in the jaw G and secure the blade firmly in position. These screws or bolts being removable, the blade can be easily detached for sharpening, or if broken another blade can be substituted therefor. The ear $a$, when the jaws are distended, prevents twigs or other substances slipping between the shanks into the recess between the rear edge of blade J and shanks C G. By this construction the cutting operation begins close to the pivot of the pieces, and hence a powerful leverage can be exerted at the point where the thickest stem would lie naturally, and the shape of the blade and jaw insures a downward and inward movement of the cutting-blade; or, in other words, in closing the jaws the blade cuts through the substance caught in jaw B in a downward and rearward direction, or what is called a "draw cut," instead of a direct shear cut. However, we do not claim anything upon the peculiar cutting operation of the blade. The point b, when the jaws are separated, assists the operator in gathering the stalks or stems between the jaws by directing them into the jaw B.

Having thus described our invention, what we claim as new is—

1. The combination, in a tobacco-cutting implement, of the piece A, having a curved jaw B, a shank C, and an ear a at the junction of said shank and jaw and formed integral therewith, with the piece E, having a shank F and jaw G formed integral, and the removable blade having a rear curved and sharpened edge j and fitted on and secured to jaw G, and the bolt pivotally uniting pieces A E, substantially as and for the purpose specified.

2. The herein-described cutting implement, consisting of the piece A, having a jaw B, shank C, arm D, and ear a, formed substantially as described, and the piece E, having a shank F and jaw G, and the blade J, having a rear rounded portion j and angular piece K, the bolt H uniting said pieces, and the collar I on said bolt, all constructed and arranged for the purpose and substantially as set forth.

In testimony that we claim the foregoing as our own we affix our signatures in presence of two witnesses.

FREDERICK GERFIN.
FREDRICK C. GERFIN.

Witnesses:
SAM. EVANS,
SAMUEL HUGHES.